(12) United States Patent
Lin et al.

(10) Patent No.: US 8,699,118 B2
(45) Date of Patent: Apr. 15, 2014

(54) BORDER STRUCTURE FOR VIEWABLE AREA OF ELECTRONIC PAPER DISPLAY

(75) Inventors: Chun-Yi Lin, Hsinchu (TW); Chuan-Feng Liu, Hsinchu (TW); Jia-Hung Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 206 days.

(21) Appl. No.: 13/100,227

(22) Filed: May 3, 2011

(65) Prior Publication Data

US 2012/0170104 A1 Jul. 5, 2012

(30) Foreign Application Priority Data

Dec. 30, 2010 (TW) .............................. 99146822 A

(51) Int. Cl.
*G02B 26/00* (2006.01)

(52) U.S. Cl.
USPC .......................................... 359/296

(58) Field of Classification Search
USPC ................................................... 359/290–297
See application file for complete search history.

(56) References Cited

U.S. PATENT DOCUMENTS

| 8,241,731 | B2 * | 8/2012 | Ohgaki et al. | 428/166 |
| 2008/0030824 | A1 * | 2/2008 | Griffith et al. | 359/224 |
| 2009/0195566 | A1 * | 8/2009 | Miyazaki | 345/690 |

* cited by examiner

*Primary Examiner* — Scott J Sugarman
*Assistant Examiner* — Vipin Patel
(74) *Attorney, Agent, or Firm* — Guice Patents PLLC

(57) ABSTRACT

A border structure for viewable area of electronic paper display, including: a planarization layer; a border electrode, made of metal and disposed on the planarization layer; a glue layer, disposed on the border electrode and having on its bottom surface at least one downward extruding portion for enhancing its adhesive strength; and an electrophoretic display layer, disposed on the top surface of the glue layer.

9 Claims, 7 Drawing Sheets

BORDER STRUCTURE FOR VIEWABLE AREA OF ELECTRONIC PAPER DISPLAY

BACKGROUND OF THE INVENTION

1. Field of the Invention

The present invention relates to an electronic paper display, especially to a border structure for viewable area of an electronic paper display, capable of reducing the chance of mura defects (uneven defects or inconsistent defects) occurring in the electronic paper display.

2. Description of the Related Art

As the pixels around the border of the viewable area of an electronic paper display are prone to be covered by an edge frame, four long rectangular edge regions of the viewable area are usually preserved as border regions with four corresponding long rectangular border electrodes equipped underneath. When in operation, the electronic paper display will apply a voltage to the border electrodes to determine the display color in the border regions. The display color in the border regions is usually set to be close to the color—black for example—of the edge frame of the electronic paper display, so that the border regions can act as buffer regions to absorb the width variations of the edge frame. Please refer to FIG. 1, which illustrates a rear view of a partial structure of a prior art electronic paper display. As illustrated in FIG. 1, the partial structure includes, from front to rear, a protection sheet 100, an FPL (Front Plane Laminate) 110, and an electrodes plane—including a border electrode 120 (corresponding to a border region) and a plurality of pixel electrodes 130.

In the structure, the protection sheet 100 is made of a transparent material. The FPL 110 includes a glue layer, an electrophoretic display layer, an ITO (Indium Tin Oxide) layer, and a PET (PolyEthylene Terephthalate) layer. The border electrode 120 and the pixel electrodes 130 are made of metal. When in operation, the electronic paper display will apply corresponding voltages to the pixel electrodes 130 and the border electrode 120 to generate electric fields for effecting the electrophoretic display layer, so that the FPL 110 will show a framed image.

As for the structure of the border regions, please refer to FIG. 2, which illustrates a partial sectional view of a border region. As illustrated in FIG. 2, the composition thereof includes, from top to bottom, a protection sheet 100, a FPL 110, a border electrode 120, and a planarization layer 140, wherein the FPL 110 includes, from top to bottom, a glue layer 111, an electrophoretic display layer 112, an ITO layer 113, and a PET layer 114. When a voltage difference is applied between the border electrode 120 and the ITO layer 113, an electrical field will be generated accordingly to effect micro capsules or micro cups of the electrophoretic display layer 112 in the border region, so as to make the FPL 110 display an edge band pattern.

However, when peel-offs occur in the interface between the glue layer 111 and the border electrode 120 under an environment of high temperature and high humidity, the electrical field distribution over the electrophoretic display layer 112 will become non-uniform, causing mura defects (uneven defects or inconsistent defects) to occur in the display of the edge band pattern.

To tackle the mentioned mura problem of the electronic paper display, the present invention proposes a novel border structure for viewable area of electronic paper display, which can enhance the adhesive effect of the glue layer, and thereby reduce the chance of mura defects occurring in the border regions of viewable area.

SUMMARY OF THE INVENTION

One objective of the present invention is to disclose a border structure for viewable area of electronic paper display, which can enhance the adhesive strength of the glue layer.

Another objective of the present invention is to disclose a border structure for viewable area of electronic paper display, in which the glue layer can adhere not only to the border electrode, but also to the planarization layer below the border electrode.

To attain the foregoing objectives, a border structure for viewable area of electronic paper display is proposed, the border structure including a planarization layer, a border electrode, a glue layer, and an electrophoretic display layer.

In the structure, the planarization layer is made of resin.

The border electrode is disposed on the planarization layer and made of metal.

The glue layer is disposed on the border electrode and has on its bottom surface at least one downward extruding portion for enhancing the adhesive strength of the glue layer.

The electrophoretic display layer, disposed on the top surface of the glue layer, can be a microcapsule layer or a micro cup electrophoretic layer.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
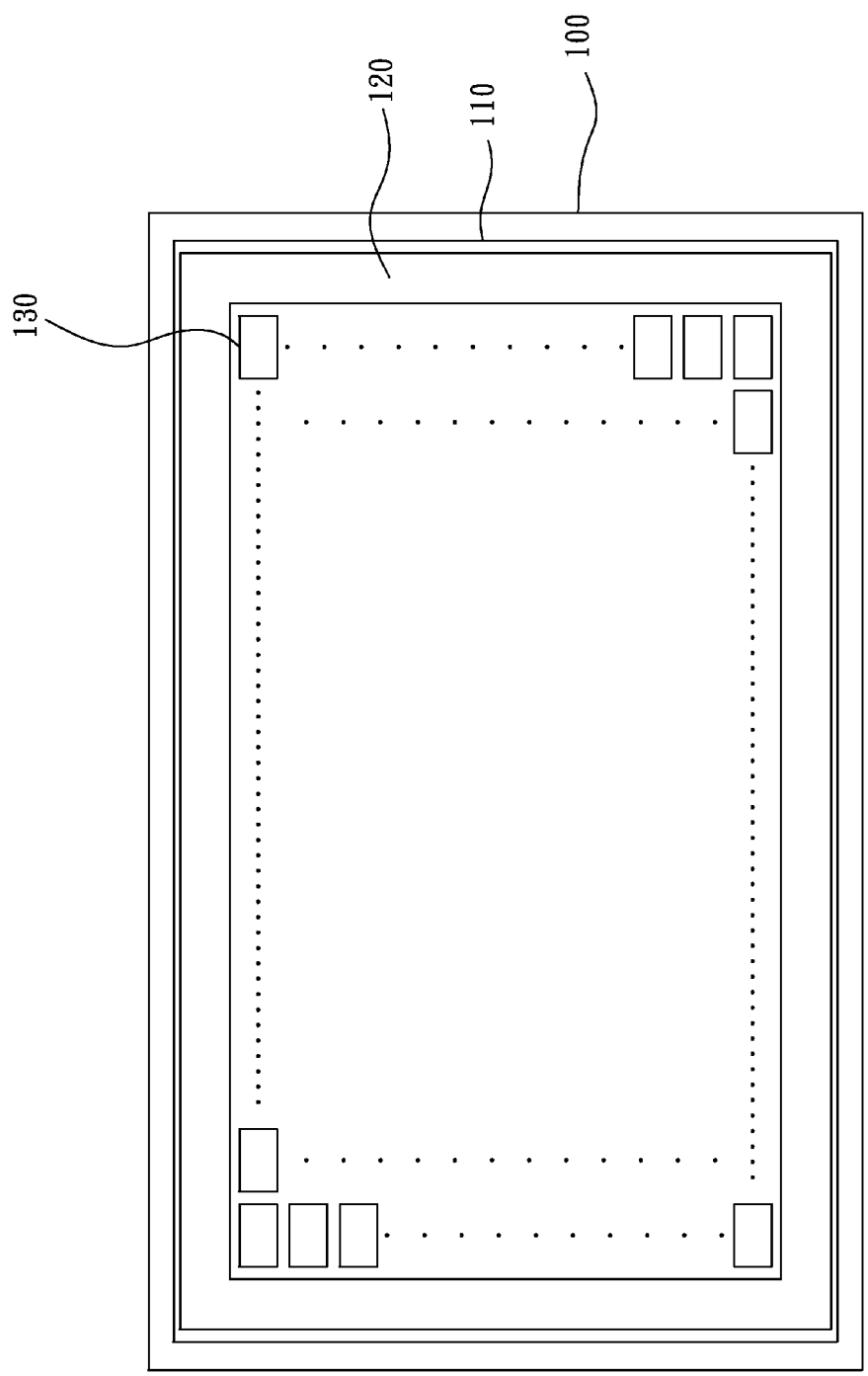
FIG. 1 illustrates a rear view of a partial structure of a prior art electronic paper display.
Figure 2:
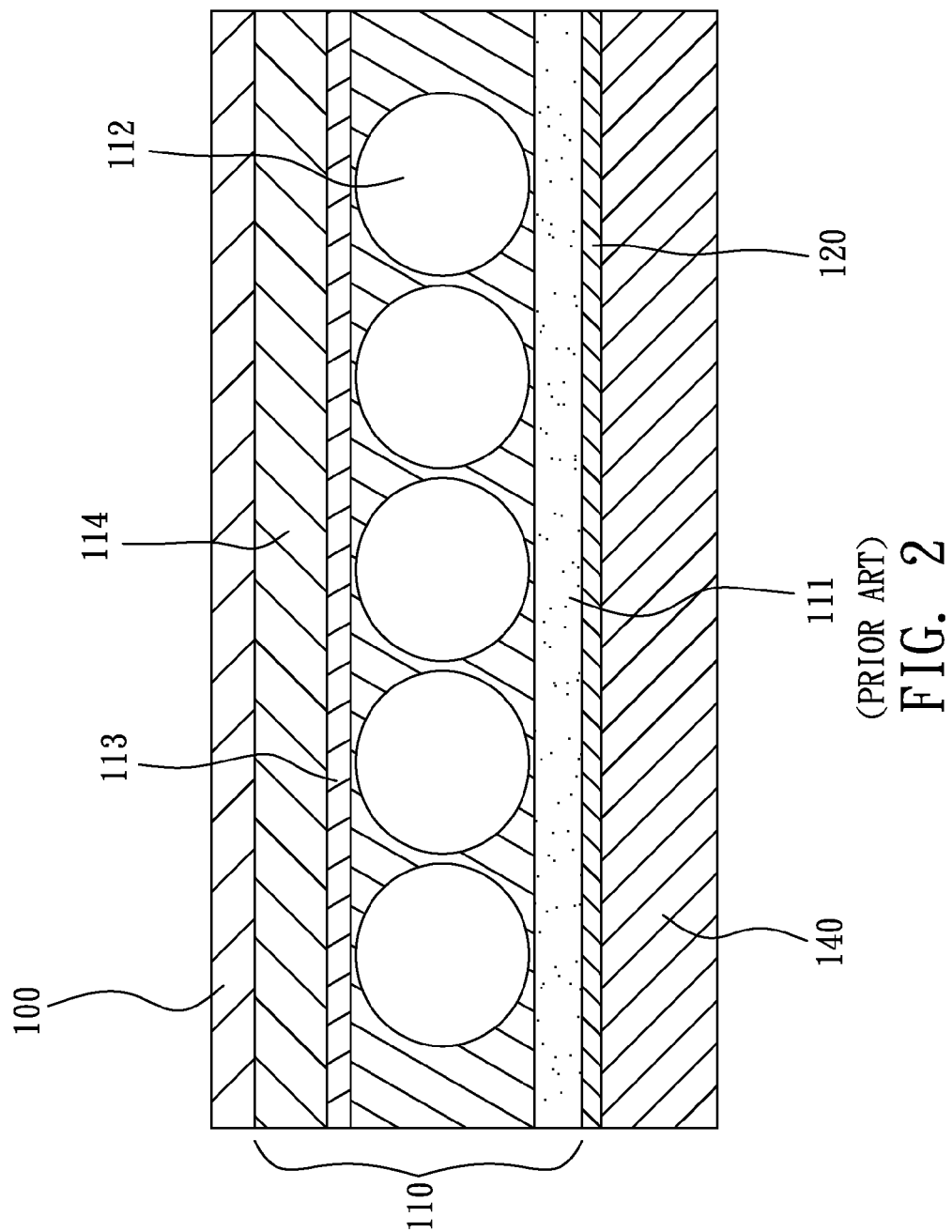
FIG. 2 illustrates a partial sectional view of a border region of a prior art electronic paper display.

The present invention will be described in more detail hereinafter with reference to the accompanying drawings that show the preferred embodiment of the invention.

To enhance the adhesive effect of the glue layer so as to reduce the chance of mura defects occurring in the border regions of viewable area, the present invention proposes a border structure for viewable area of electronic paper display, in which a glue layer has on its bottom surface a plurality of downward extruding portions. Please refer to FIG. 3, which illustrates a partial sectional view of a border structure for viewable area of electronic paper display according to a preferred embodiment of the present invention. As can be seen in the figure, the border structure for viewable area includes, from top to bottom, a protection sheet 200, a FPL 210, a border electrode 220, and a planarization layer 240, wherein the FPL 210 includes, from bottom to top, a glue layer 211, an electrophoretic display layer 212, an ITO layer 213, and a PET layer 214. When a voltage difference exists between the border electrode 220 and the ITO layer 213, an electrical field will be generated accordingly to effect micro capsules or micro cups of the electrophoretic display layer 212 in the border region, so as to make the FPL 210 display an edge band pattern, wherein the electrophoretic display layer 212 can be a microcapsule layer or a micro cup electrophoretic layer.

Figure 3:
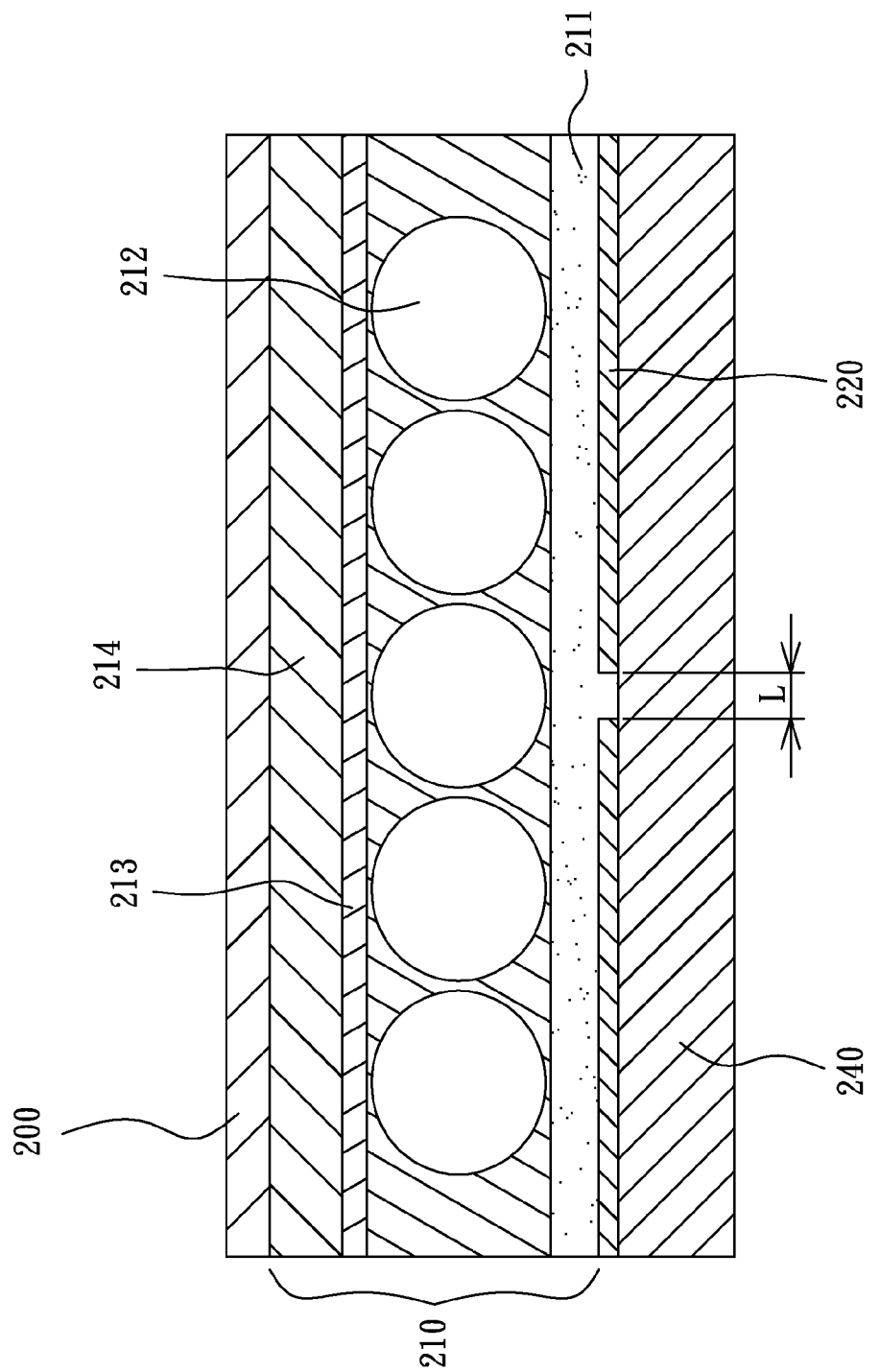
FIG. 3 illustrates a partial sectional view of a border structure for viewable area of electronic paper display according to a preferred embodiment of the present invention.

In the partial sectional view of FIG. 3, the glue layer 211 has on its bottom surface a downward extruding portion, used to increase the contact area of the bottom surface of the glue layer 211, and thereby enhance the adhesive effect of the glue layer 211. The border electrode 220 has a gap, used to cooperate with the planarization layer 240 to form a ditch to accommodate the downward extruding portion of the glue layer 211. As the adhesive strength between the glue layer 211 and the planarization layer 240 (resin layer) is generally higher than that between the glue layer 211 and the border electrode 220, the width L of the ditch is preferably around one fourth of the diameter of a microcapsule, so that, with the microcapsule or micro cup above the ditch still being effectively reached by the electrical field, the adhesive strength between the glue layer 211 and the planarization layer 240 can contribute to enhance the adhesive effect of the glue layer 211.

Figure 4:
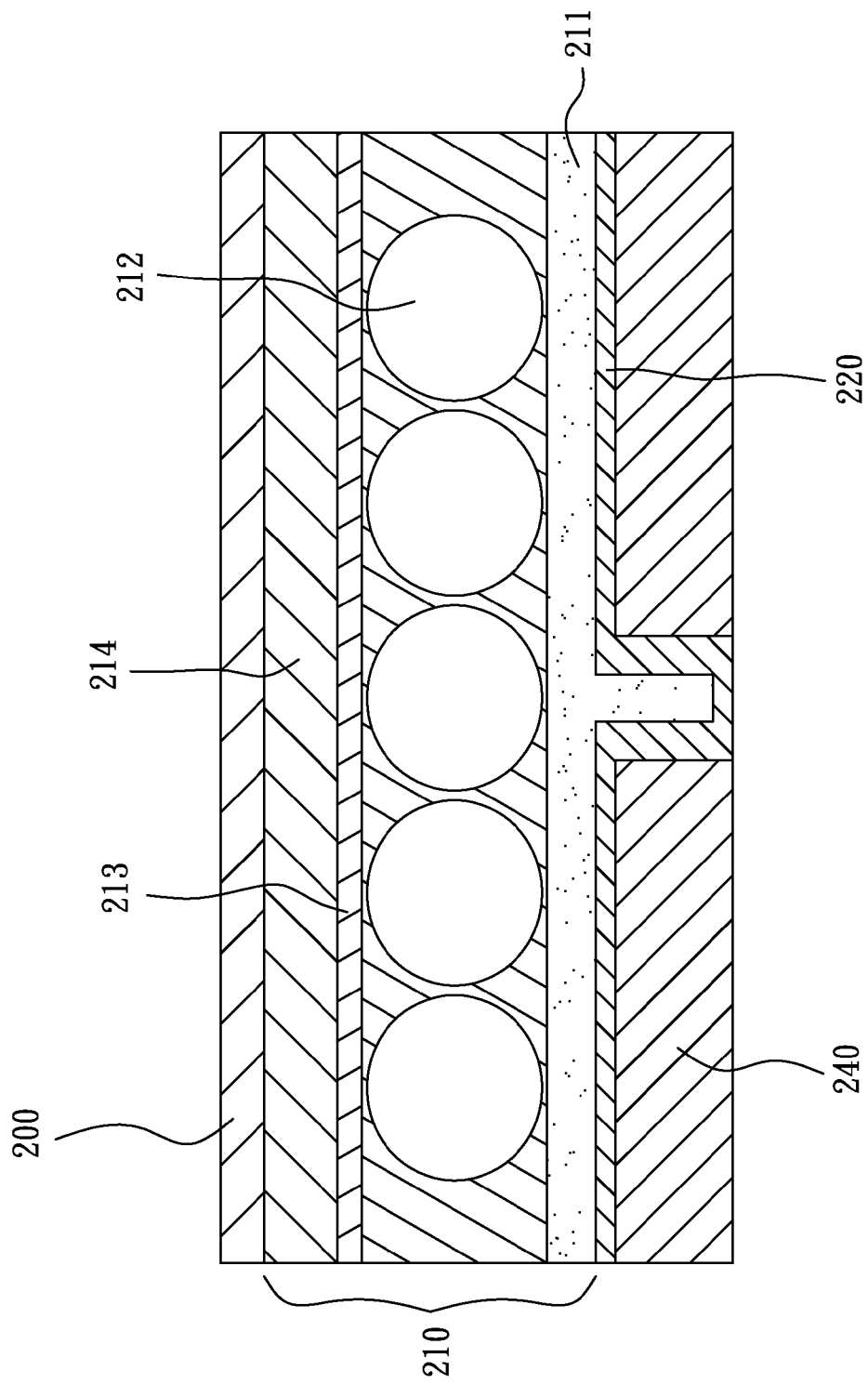
FIG. 4 illustrates a partial sectional view of a border structure for viewable area of electronic paper display according to another preferred embodiment of the present invention.

Please refer to FIG. 4, which illustrates a partial sectional view of a border structure for viewable area of electronic paper display according to another preferred embodiment of the present invention. As illustrated in FIG. 4, the glue layer 211 has on its bottom surface a downward extruding portion, used to increase the contact area of the bottom surface of the glue layer 211, and thereby enhance the adhesive effect of the glue layer 211. The border electrode 220 has a downward bending portion for accommodating the downward extruding portion of the glue layer 211. The planarization layer 240 has a notch to accommodate the downward bending portion of the border electrode 220.

In the embodiment illustrated in FIG. 4, the engagement of the downward extruding portion with the downward bending portion of the border electrode 220 can increase the contact area of the bottom surface of the glue layer 211, and thereby enhance the adhesive effect of the glue layer 211.

Figure 5:
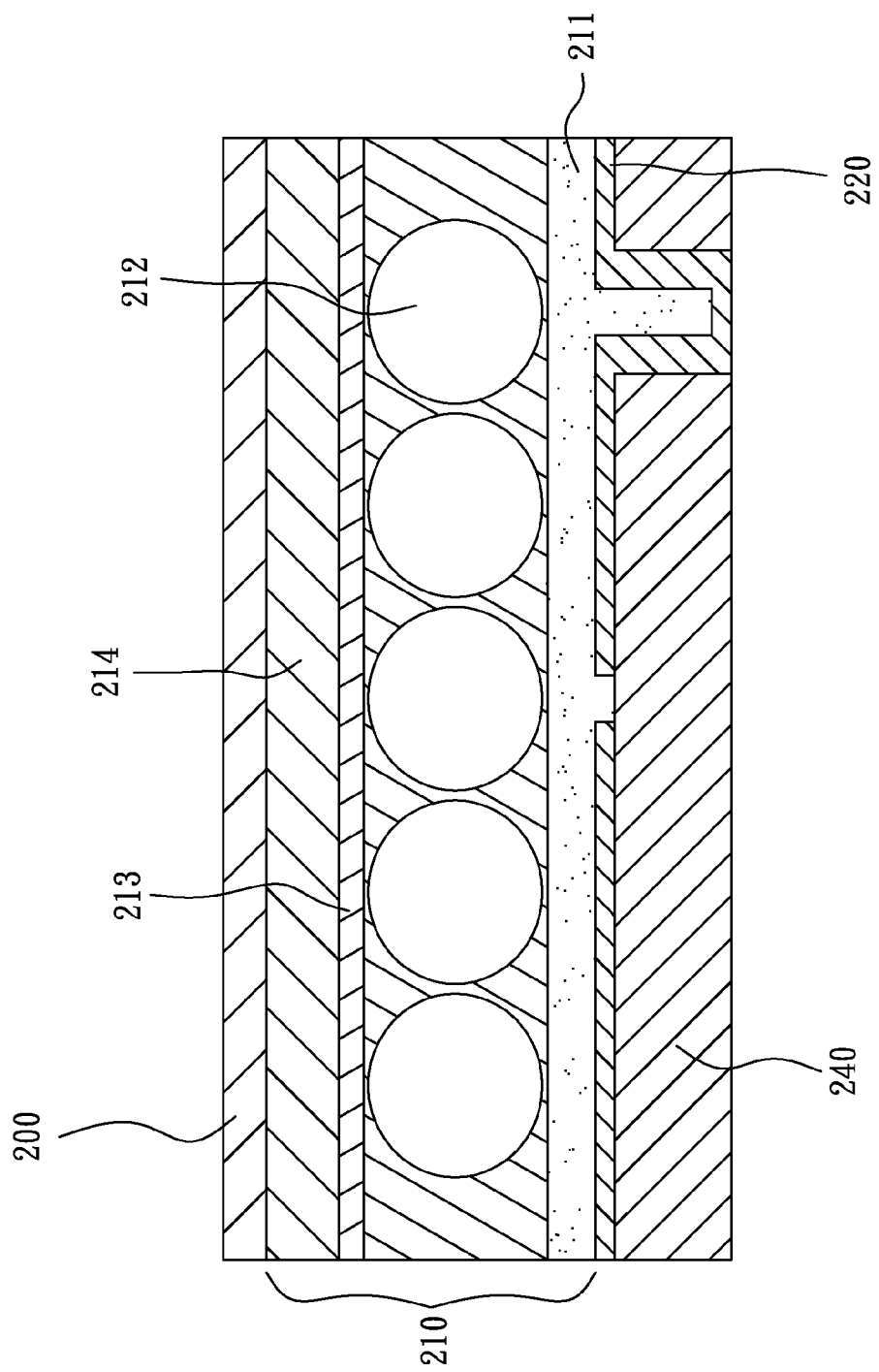
FIG. 5 illustrates a partial sectional view of a border structure for viewable area of electronic paper display according to still another preferred embodiment of the present invention.

Please refer to FIG. 5, which illustrates a partial sectional view of a border structure for viewable area of electronic paper display according to still another preferred embodiment of the present invention. As illustrated in FIG. 5, the glue layer 211 has on its bottom surface a first downward extruding portion and a second downward extruding portion, used to increase the contact area of the bottom surface of the glue layer 211, and thereby enhance the adhesive effect of the glue layer 211. The border electrode 220 has a gap and a downward bending portion, wherein the gap is used to cooperate with the planarization layer 240 to form a ditch for accommodating the first downward extruding portion of the glue layer 211, while the downward bending portion is used for accommodating the second downward extruding portion of the glue layer 211. The planarization layer 240 has a notch to accommodate the downward bending portion of the border electrode 220.

In the embodiment illustrated in FIG. 5, apart from the contact between the first downward extruding portion of the glue layer 211 and the planarization layer 240 being designed for increasing the adhesive strength of the glue layer 211, the engagement of the second downward extruding portion with the downward bending portion of the border electrode 220 is further used to increase the contact area of the bottom surface of the glue layer 211, and thereby enhance the adhesive effect of the glue layer 211.

Figure 6:
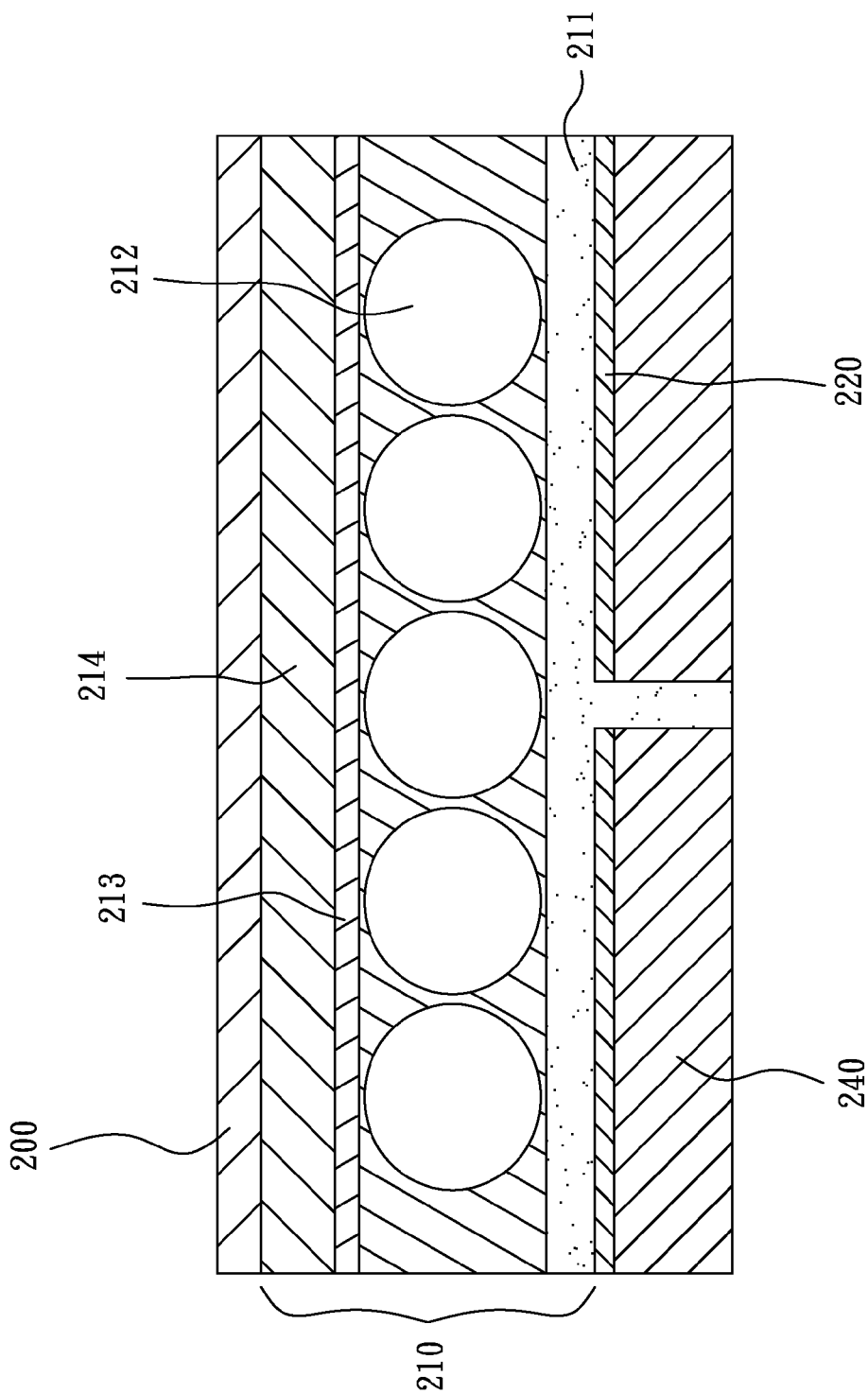
FIG. 6 illustrates a partial sectional view of a border structure for viewable area of electronic paper display according to still another preferred embodiment of the present invention.

Please refer to FIG. 6, which illustrates a partial sectional view of a border structure for viewable area of electronic paper display according to still another preferred embodiment of the present invention. As illustrated in FIG. 6, the glue layer 211 has on its bottom surface a downward extruding portion, used to increase the contact area of the bottom surface of the glue layer 211, and thereby enhance the adhesive effect of the glue layer 211. The border electrode 220 has a gap, used for the downward extruding portion of the glue layer 211 to pass through. The planarization layer 240 has a notch for accommodating the downward extruding portion of the glue layer 211, wherein the width of the gap is preferably around one fourth of the diameter of a microcapsule.

In the embodiment illustrated in FIG. 6, the engagement of the downward extruding portion with the notch of the planarization layer 240 can increase the contact area and the adhesive strength of the bottom surface of the glue layer 211, and thereby enhance the adhesive effect of the glue layer 211.

Figure 7:
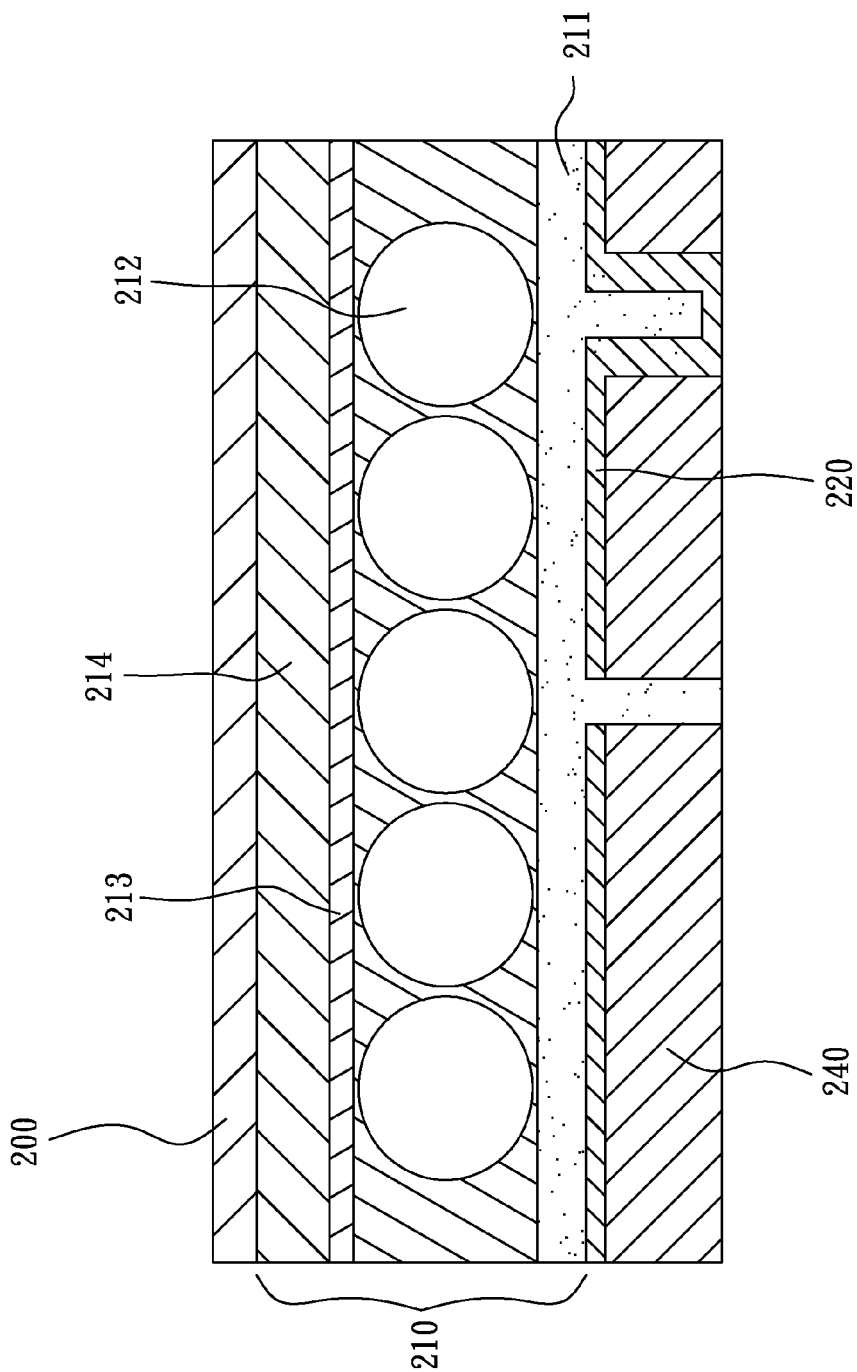
FIG. 7 illustrates a partial sectional view of a border structure for viewable area of electronic paper display according to still another preferred embodiment of the present invention.

Please refer to FIG. 7, which illustrates a partial sectional view of a border structure for viewable area of electronic paper display according to still another preferred embodiment of the present invention. As illustrated in FIG. 7, the glue layer 211 has on its bottom surface a first downward extruding portion and a second downward extruding portion, used to increase the contact area of the bottom surface of the glue layer 211, and thereby enhance the adhesive effect of the glue layer 211. The border electrode 220 has a gap and a downward bending portion, wherein the gap is used for the first downward extruding portion of the glue layer 211 to pass through, while the downward bending portion is used for accommodating the second downward extruding portion of the glue layer 211.

The planarization layer 240 has a first notch and a second notch to accommodate the first downward extruding portion of the glue layer 211 and the downward bending portion of the border electrode 220 respectively.

In the embodiment illustrated in FIG. 7, apart from the contact between the first downward extruding portion of the glue layer 211 and the first notch of the planarization layer 240 being designed for increasing the adhesive strength of the glue layer 211, the engagement of the second downward extruding portion with the downward bending portion of the border electrode 220 is further used to increase the contact area of the bottom surface of the glue layer 211, and thereby enhance the adhesive effect of the glue layer 211.

Due to the novel design, the present invention has the following advantages:

1. The border structure for viewable area of electronic paper display of the present invention can reduce the chance of mura defects occurring in the border regions of viewable area of electronic paper display, without changing the materials of original compositions or increasing additional compositions.

2. The downward extruding portion, gap, and notch of the border structure for viewable area of electronic paper display of the present invention can be implemented by utilizing general manufacturing processes.

3. Apart from being able to enhance the adhesive effect of the glue layer to reduce the chance of mura defects occurring in the border regions of electronic paper display, the border structure for viewable area of electronic paper display of the present invention can further prevent moisture and air from entering the viewable area of the display, and thereby prolong the operational life of the electronic paper display.

In summary, the border structure for viewable area of electronic paper display of the present invention can be implemented by utilizing general manufacturing processes without changing the materials of original compositions or increasing additional compositions. Besides, the enhanced adhesive effect of the glue layer can not only reduce the chance of mura defects occurring in the border regions of electronic paper display, but also protect the viewable area of the display. As such, the present invention does improve the prior art electronic paper displays.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A border structure for viewable area of electronic paper display, comprising:
   a planarization layer;
   a border electrode located on said planarization layer in a border region of the viewable area and made of metal;
   a glue layer, disposed on said border electrode and having on its bottom surface at least one downward extruding portion for enhancing the adhesive strength of said glue layer; and
   an electrophoretic display layer, disposed on the top surface of said glue layer;
   wherein said border electrode comprises at least one gap and said planarization layer comprises at least one notch, wherein said at least one gap is used for said at least one downward extruding portion of said glue layer to pass through, and said at least one notch is used for accommodating said at least one downward extruding portion of said glue layer.

2. The border structure for viewable area of electronic paper display as claim 1, wherein said planarization layer comprises resin.

3. The border structure for viewable area of electronic paper display as claim 1, wherein said electrophoretic display layer is a microcapsule layer or a micro cup electrophoretic display layer.

4. The border structure for viewable area of electronic paper display as claim 2, wherein said border electrode comprises at least one gap to cooperate with said planarization layer to form at least one ditch for accommodating said at least one downward extruding portion of said glue layer.

5. The border structure for viewable area of electronic paper display as claim 2, wherein said border electrode comprises at least one downward bending portion and said planarization layer comprises at least one notch, wherein said at least one downward bending portion is used for accommodating said at least one downward extruding portion of said glue layer, and said at least one notch is used for accommodating said at least one downward bending portion.

6. A border structure for viewable area of electronic paper display, comprising:
   a planarization layer;
   a border electrode located on said planarization layer in a border region of the viewable area and made of metal;
   a glue layer, disposed on said border electrode and having on its bottom surface at least one first downward extruding portion and at least one second downward extruding portion for enhancing the adhesive strength of said glue layer; and
   an electrophoretic display layer, disposed on the top surface of said glue layer;
   wherein said border electrode comprises at least one gap and at least one downward bending portion, and said planarization layer comprises at least one first notch and at least one second notch, wherein said at least one gap is used for said at least one first downward extruding portion to pass through, said at least one first notch is used for accommodating said at least one first downward extruding portion, said at least one downward bending portion is used for accommodating said at least one second downward extruding portion of said glue layer, and said at least one second notch is used for accommodating said at least one downward bending portion.

7. The border structure for viewable area of electronic paper display as claim 6, wherein said planarization layer comprises resin.

8. The border structure for viewable area of electronic paper display as claim 6, wherein said electrophoretic display layer is a microcapsule layer or a micro cup electrophoretic display layer.

9. The border structure for viewable area of electronic paper display as claim 7, wherein said border electrode comprises at least one gap and at least one downward bending portion, and said planarization layer comprises at least one notch, wherein said at least one gap is used to cooperate with said planarization layer to form at least one ditch for accommodating said at least one first downward extruding portion of said glue layer, said at least one downward bending portion is used for accommodating said at least one second downward extruding portion of said glue layer, and said at least one notch is used for accommodating said at least one downward bending portion.

* * * * *